July 22, 1930. W. J. VAN DER KLOET ET AL 1,771,362
CONNECTION FOR IRON CONSTRUCTIONS
Filed Dec. 18, 1926 3 Sheets-Sheet 1
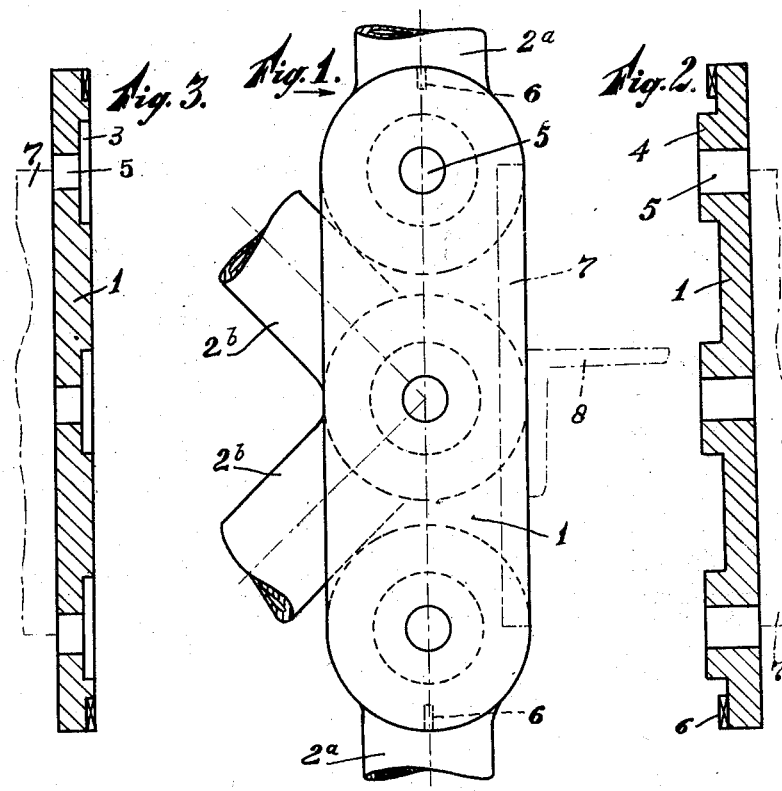
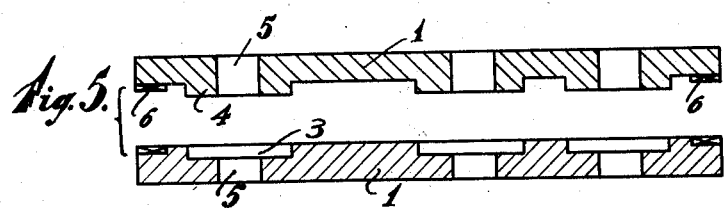
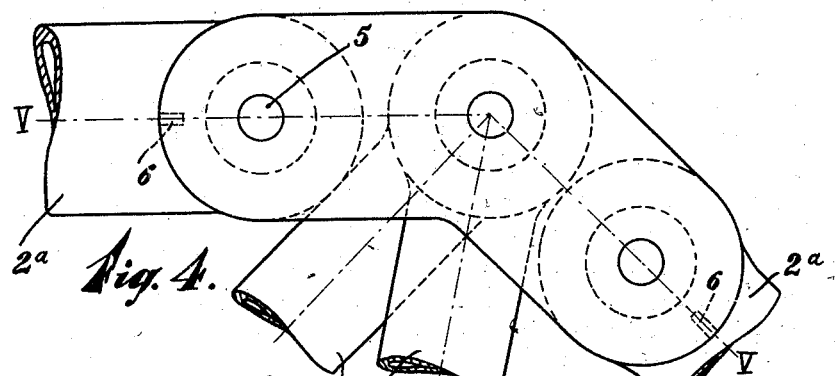

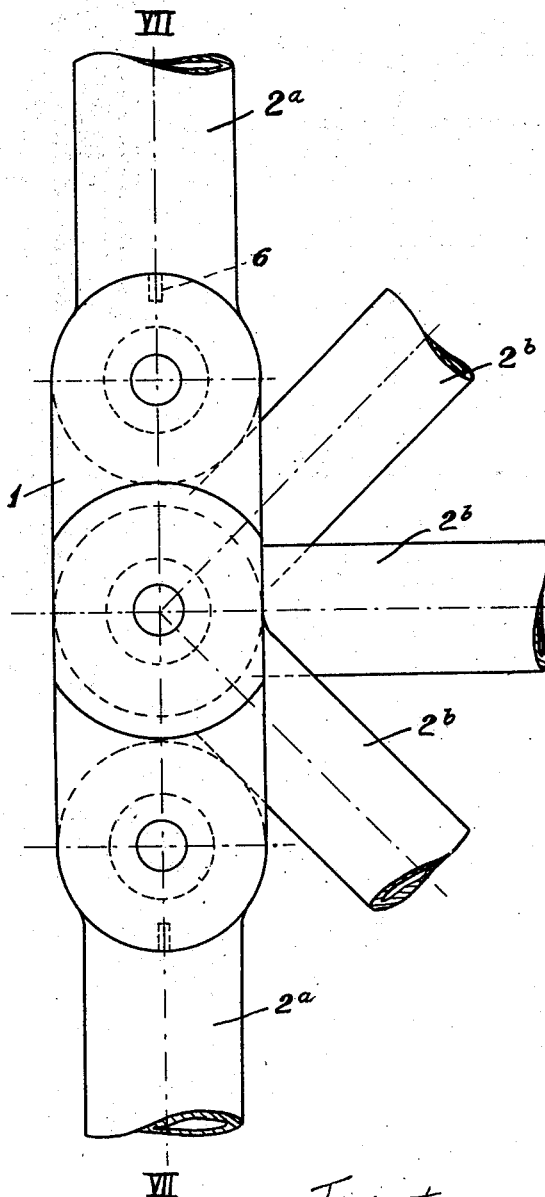
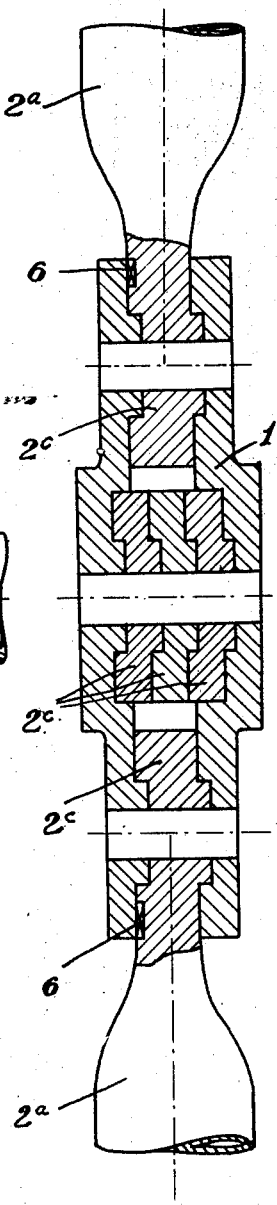

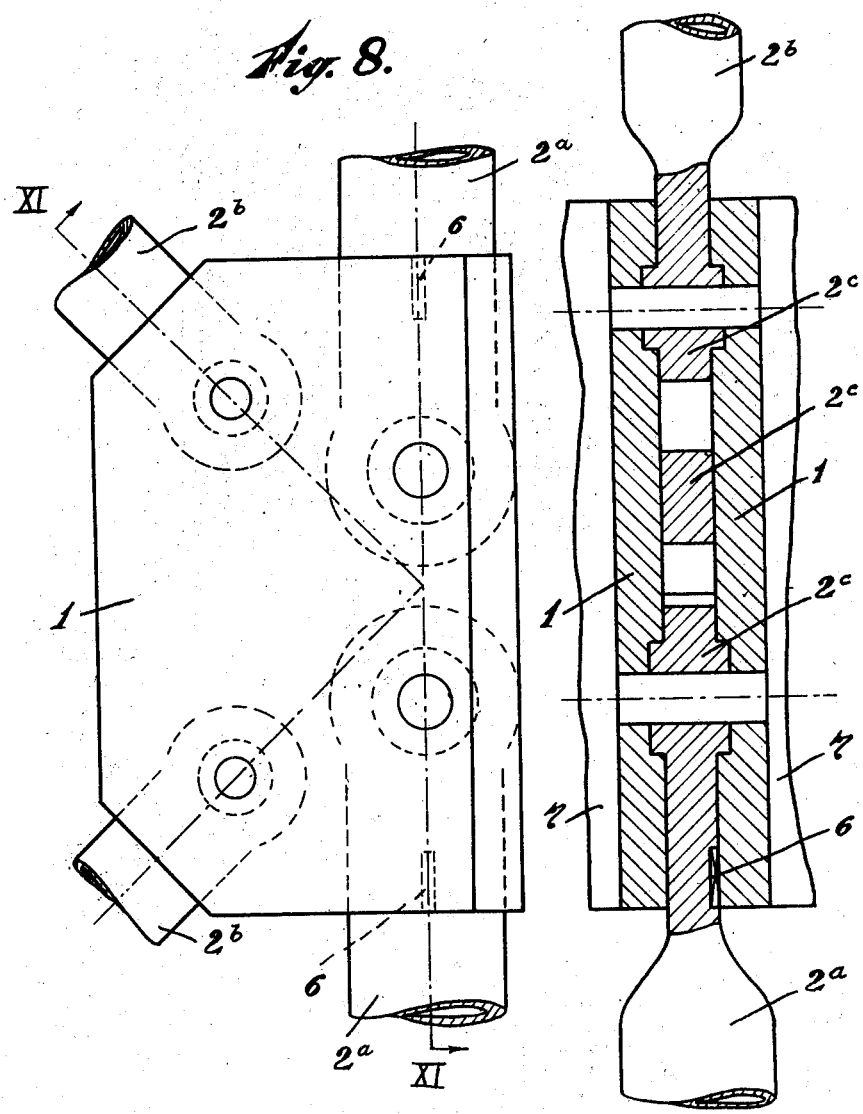

Patented July 22, 1930

1,771,362

UNITED STATES PATENT OFFICE

WILLEM JOSUA VAN DER KLOET AND WILLEM ALEXANDER LODEWIJK STIFT, OF THE HAGUE, NETHERLANDS, ASSIGNORS TO GENERAL ENGINEERING AND INVESTMENT COMPANY LIMITED, OF LONDON, ENGLAND

CONNECTION FOR IRON CONSTRUCTIONS

Application filed December 18, 1926, Serial No. 155,750, and in the Netherlands December 19, 1925.

The invention relates to a connection for iron constructions comprising metal tubes, which are at both ends provided with a flattened portion, having a bore for the passage of a bolt and the invention also relates to a junction-plate for making such a connection.

It is already known to make iron constructions from metal tubes, which have both ends provided with a flattened portion, and which at each side are provided with one or more tongues or grooves and with a central bore. The junction points in constructions of this type are obtained by the interengagement of the flattened ends of the tubes, meeting in one point, by means of tongue and groove and by connecting the adjacent flattened ends by means of a bolt passing through the central opening.

In order to avoid the undesirable stresses created by this type of connection, the flattened ends of the tubes according to the invention are engaged at one or both sides by means of groove and tongue constructions between a pair of junction-plates, which plates are held together by bolts passing through the bore of the flattened ends of the tubes. If more than two tubes meet in one point, some of the plurality of meeting tubes engage each other by means of groove and tongue constructions.

The junction-plate which in accordance with the invention is used for making the above connection is provided with at least two tongues or grooves and with at least two bores, while it may be provided moreover with a bent marginal portion.

By using a junction-plate according to the invention in iron constructions of the above type the bolts which are used for holding the plates together are not only entirely free from shearing stresses, but they are moreover almost all entirely free from unfavourable bending stresses occurring in the known constructions by reason of the fact that the tensile and compressive forces of the tubes are maintained almost central. The tensile and compressive forces may be maintained entirely centrally by enclosing the flattened ends of the tubes in the corners of a polygon between a pair of junction plates. The bolts for holding the plates together are thus only subjected to tension and are entirely free from bending and shearing stresses.

In the accompanying drawings four embodiments of the invention are shown by way of example.

Fig. 1 is an elevational view of a four tube connection,

Fig. 2 is a cross-sectional view of the right junction-plate,

Fig. 3 is a similar view of the left junction-plate,

Fig. 4 is an elevational view of a connection of four tubes in which the main beams are not in alignment.

Fig. 5 is a section on the line V—V through the juncton-plates according to Fig. 4.

Fig. 6 shows an elevational view of a connection of five tubes.

Fig. 7 is a section on the line VII—VII in Fig. 6.

Fig. 8 shows an elevational view of a connection of four tubes, the ends of which are located in the corners of a quadrangle.

Fig. 9 is a section on the line IX—IX in Fig. 8.

The flattened ends $2^c$ of the tubes $2^a$ and $2^b$ are provided with tongues or grooves fitting into corresponding grooves 3 or around tongues 4 of junction-plates 1. Through the openings 5 in the junction-plates, axially registering with the bore in the flattened ends of the tubes, a bolt is passed for holding the junction plates together.

In order to prevent predetermined tubes from turning, the junction-plates may be provided with tongues 6 fitting in the corresponding recesses of the flattened portion of the tubes. However, this turning tendency may also be prevented by giving another shape to the interengaging tongue and groove.

The junction-plates may have any desired shape in connection with their application. For a continuous connection a pair of flat junction-plates (Figs. 1, 6 and 8) may be used, while for angularly meeting main beams the junction-plate will have a correspondingly bent shape.

If permitted by the interstice between the junction-plates the flattened ends of a plurality of diagonal tubes may be placed upon each other and be enclosed together between the junction-plates as shown in Figs. 6 and 7. In heavy constructions, in which this superposing of a plurality of flattened ends is not desirable, a pair of junction-plates according to Figs. 8 and 9 may be used, each flattened portion being separately enclosed between the junction-plates in a corner of a polygon.

In some constructions it is advantageous to provide the junction-plate with a bent marginal portion or edge 7, whereby convenient attachment-points for angle irons 8, booms and the like are obtained.

By applying the invention it is now possible to make iron constructions of unlimited dimensions from metal tubes whereby, without giving up strength, a saving of weight of about 30% may be obtained.

We claim:—

1. A joint for metal building constructions comprising a plurality of members having flat ends, each flat end being formed with a cylindrical boss on one side and a corresponding cylindrical recess on the other, the members being arranged in a group with their ends nested together, the boss at the end of one member fitting into the recess at the end of an adjacent member, junction plates at the sides of the group of nested ends, one plate having a cylindrical recess receiving the outside boss of said group of ends, the other having a cylindrical boss received in the outside recess of said group, all said bosses and recesses being coaxial and being coaxially perforated for the reception of a bolt.

2. A joint for metal building constructions, comprising a plurality of members having flat ends, each flat end being formed with a cylindrical boss on one side and a corresponding cylindrical recess on the other, the members being arranged in a group with their ends nested together, the boss at the end of one member, fitting into the recess at the end of an adjacent member, junction plates at the sides of the group of nested ends, said plates having at different places, pairs of bosses and recesses, each pair comprising a boss on one plate and a corresponding recess on the other plate, one pair cooperating with the nested group of ends, the respective boss and recess of said pair interfitting with the outside respective recess and boss on said group of ends, and a supporting flat-ended member having a boss on one side of said end and a corresponding recess on the other side interfitting respectively with the recess and boss constituting the other pair, on said junction plates and means to prevent relative rotation between said supporting member and said junction plates.

In testimony whereof we affix our signatures.

WILLEM JOSUA van der KLOET.
WILLEM ALEXANDER LODEWIJK STIFT.